A. G. HUNTER.
CHURN.
APPLICATION FILED JAN. 4, 1911.
1,001,851.
Patented Aug. 29, 1911.
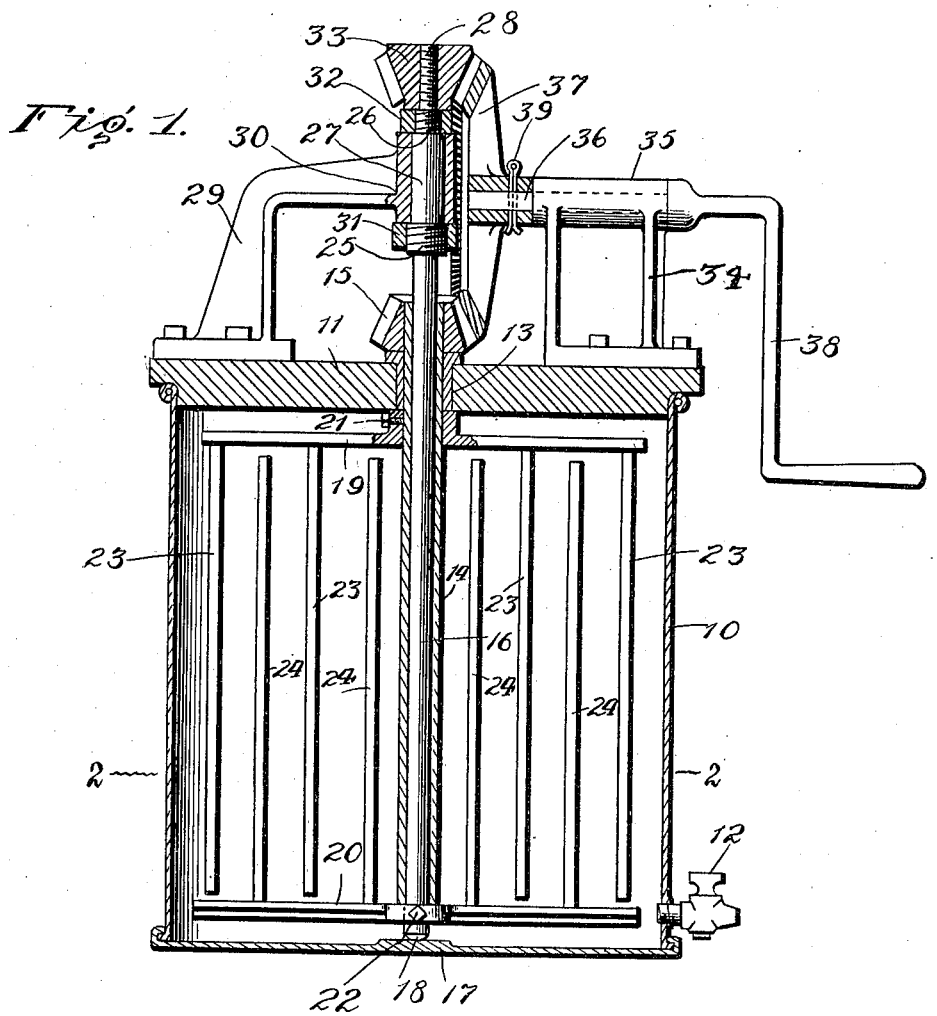
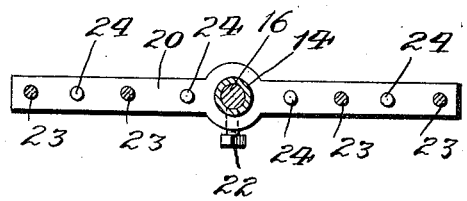
Witnesses
Inventor
A. G. Hunter
By ........., Attorneys.

UNITED STATES PATENT OFFICE.

ARCHIE G. HUNTER, OF GLAZIER, TEXAS.

CHURN.

1,001,851.

Specification of Letters Patent.

Patented Aug. 29, 1911.

Application filed January 4, 1911. Serial No. 600,780.

*To all whom it may concern:*

Be it known that I, ARCHIE G. HUNTER, citizen of the United States, residing at Glazier, in the county of Hemphill and State of Texas, have invented certain new and useful Improvements in Churns, of which the following is a specification.

This invention relates to improvements in churns and has for one of its objects to provide a simply constructed device which is effective in operation and in which the parts are arranged to be readily dismembered for cleansing or repairs.

Another object of the invention is to provide a device of this character whereby the parts may be adjusted to prevent abnormal friction.

With these and other objects in view, the invention consists in certain novel features of construction as hereafter shown and described and then specifically pointed out in the claim; and, in the drawings illustrative of the preferred embodiment of the invention, Figure 1 is a vertical sectional elevation of the improved churn; Fig. 2 is a transverse section on the line 2—2 of Fig. 1.

Corresponding and like parts are referred to in the following description and indicated in all the views of the accompanying drawings by the same reference characters.

The improved device comprises a receptacle or body 10, of any suitable material and any suitable shape and size, but preferably of sheet metal and in cylindrical form and provided with a detachable closure 11, the latter being preferably of wood and rabbeted to engage within the upper portion of the receptacle, as shown. The receptacle is preferably provided with a draw-off valve 12 of suitable construction.

Fitting through the top 11 of the receptacle is a bushing 13, and mounted for rotation through this bushing is a tubular shaft 14 which extends nearly to the bottom of the receptacle and likewise extends above the bushing and is provided with a beveled pinion 15 at its upper end and supported upon the bushing as a bearing. Mounted for rotation through the tubular shaft 14 is a solid shaft 16 which extends at its lower end for engagement with the bottom of the receptacle, which is preferably thickened at 17 to form a flat surface or step for the shaft 16, the latter being rounded at its lower end to reduce the friction, as shown at 18.

Connected to the tubular shaft 14 just below the bushing 13 is an arm 19, while a similar arm 20 is connected to the inner shaft 16 below the tubular shaft 14. The arm 19 is secured detachably to the tubular shaft 14 by a clamp screw 21, while the arm 20 is likewise detachably secured to the shaft 16 by a clamp screw 22, so that the arms may be detached from the shafts or adjusted thereon as required.

Directed downwardly from the arm 19 are a plurality of rods 23 spaced apart, and rising from the arm 20 are a plurality of similar rods 24, the two sets of rods being spaced at uniform distances apart, as shown. The rods 23 terminate short of the arm 20, while the rods 24 terminate short of the arm 19, as shown. By this means the shaft 16 with its arm 20 and rods 24 may be rotated without interfering with the rotation of the shaft 14 and the arm 19 and rods 23. The shaft 16 is extended for a considerable distance above the beveled pinion 15 and is provided with two threaded portions 25—26 spaced apart and leaving an unthreaded bearing portion 27 between the threaded portions. At its upper end the shaft 16 is formed with another threaded portion 28 smaller than the threaded portion 26 and with the threads running reversely thereto, or left handed, as shown.

Rising from the top member 11 of the body is a standard 29 having a vertical bearing collar or sleeve 30 in which the bearing 27 operates and is retained from vertical movement by adjusting nuts 31—32 which engage respectively with the threaded portions 25 and 26 of the shaft. By this means the shaft 16 may be adjusted vertically relative to the standard 29 and its sleeve 30 and thus control the friction between the lower rounded end 18 of the shaft and the seat 17, and also holding the arm 20 in proper relations to the bottom end of the tubular shaft 14. By this means any wear which may occur between the parts may be "taken up", and the parts maintained in proper operative relations. Another beveled pinion 33 engages the threaded portion 28 of the shaft 16, as shown.

Rising from the top 11 of the body is another standard 34 having a horizontal bearing sleeve 35 at its upper end, through which a horizontal shaft 36 is mounted for rotation. At its inner end the shaft 36 is provided with a bevel gear 37 which engages with both of the beveled pinions 15 and 33 and is provided at its outer end with an operating crank 38. The bevel gear 37 is secured detachably to the shaft 36, as by a cotter pin 39, so that the shaft and gear may be readily detached when required. With this simple arrangement it will be obvious that when the crank 38 is actuated the rotary motion of the shaft 16 will be communicated simultaneously to the two shafts 14—16 and rotate them in opposite directions, and likewise cause the rods 23—24 to rotate in opposite directions within the receptacle and produce an efficient churning action.

The beveled pinion 15 is rigidly connected to the tubular shaft 14 and thus serves the two-fold purpose of a beveled pinion and a supporting collar for the tubular shaft which bears upon the bushing 13. By this means the tubular shaft is supported in position and likewise retains the arm 20 and its rods 23 in position. The adjusting nuts 31—32, as before stated, enable the shaft 16 to be adjusted vertically to control the friction between the parts, so that no necessity exists for adjusting the tubular shaft 14 in its bearings. The beveled pinion 33 being coupled to the shaft by a left handed screw will not work loose when the gear 37 is rotated in one direction, or in the direction which it is required that the shafts 14—16 shall be rotated to produce the proper churning action, but by detaching the gear 37 and removing the shaft 36 the pinion 33 may be readily removed by rotating it in the opposite direction, as will be obvious.

It will be noted that all of the operating parts of the churn are connected to the cover 11, so that when the latter is removed the dasher and its operating mechanism are removed therewith, thus exposing all of the parts of the dasher mechanism to enable them to be readily cleansed and scalded. It will also be noted that all of the parts are readily detachable for periodical cleansing and likewise to enable any broken or impaired parts to be removed without discarding the remaining parts.

All of the parts of the improved device are of metal with the exception of the cover 11, and this portion may also be of metal if required, but generally the cover member, as above stated, will preferably be of wood.

While the improved device is designed more specifically for use as a churn, it may be employed with slight and immaterial modifications for use as a mixing device for various substances, such as cements and the like.

Having thus described the invention, what is claimed as new is:

In a churn, a receptacle, a closure detachably engaging the receptacle, a tubular shaft carried by said closure and depending into said receptacle, an inner shaft mounted for rotation through said tubular shaft and provided with threaded portions spaced apart and with a bearing between the portions, said inner shaft being stepped at its lower end upon the bottom of the receptacle, a standard upon said closure and provided with a bearing sleeve in which the inner shaft bearing engages, adjusting nuts upon the threaded portions of the inner shaft and engaging the standard sleeve, a lateral arm carried by the tubular shaft, a plurality of rods depending from the tubular shaft arm, a lateral arm carried by the inner shaft arm, a plurality of rods rising from the inner shaft arm, and means for simultaneously rotating said shafts in opposite directions.

In testimony whereof, I affix my signature in presence of two witnesses.

ARCHIE G. HUNTER. [L. S.]

Witnesses:
N. P. WILLIS,
THOS. RILEY.

---

Copies of this patent may be obtained for five cents each, by addressing the "Commissioner of Patents, Washington, D. C."